United States Patent
Zhou et al.

(10) Patent No.: US 11,231,983 B2
(45) Date of Patent: Jan. 25, 2022

(54) FAULT TOLERANCE PROCESSING METHOD, APPARATUS, AND SERVER

(71) Applicant: Huawei Technologies Co., Ltd., Shenzhen (CN)

(72) Inventors: Chao Zhou, Hangzhou (CN); Junjie Chen, Hangzhou (CN); Chenji Gong, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/121,911

(22) Filed: Dec. 15, 2020

(65) Prior Publication Data
US 2021/0096939 A1 Apr. 1, 2021

Related U.S. Application Data

(63) Continuation of application No. PCT/CN2018/093400, filed on Jun. 28, 2018.

(51) Int. Cl.
*G06F 11/07* (2006.01)

(52) U.S. Cl.
CPC ...... *G06F 11/0772* (2013.01); *G06F 11/0727* (2013.01)

(58) Field of Classification Search
CPC ............. G06F 11/0721; G06F 11/0724; G06F 11/0727; G06F 11/073; G06F 11/0772
See application file for complete search history.

(56) References Cited

U.S. PATENT DOCUMENTS

| | | | |
|---|---|---|---|
| 7,734,957 B2 * | 6/2010 | Nakamura | G06F 11/2092 714/25 |
| 2003/0217323 A1 | 11/2003 | Guterman et al. | |
| 2005/0283681 A1 | 12/2005 | Jeddeloh | |
| 2006/0015767 A1 | 1/2006 | Sun Hsu et al. | |
| 2008/0022154 A1 | 1/2008 | Endou | |
| 2011/0072222 A1 | 3/2011 | Wagner et al. | |
| 2014/0025907 A1 | 1/2014 | Fujinami et al. | |
| 2015/0378823 A1 | 12/2015 | Lesartre | |
| 2016/0283318 A1 | 9/2016 | Das et al. | |
| 2017/0060788 A1 | 3/2017 | Chang et al. | |

(Continued)

FOREIGN PATENT DOCUMENTS

| CN | 102027482 A | 4/2011 |
|---|---|---|
| CN | 102088491 A | 6/2011 |

(Continued)

*Primary Examiner* — Joseph R Kudirka
(74) *Attorney, Agent, or Firm* — Conley Rose, P.C.

(57) ABSTRACT

A fault tolerance processing method includes: sending, by a server, a data read packet to an external controller, where the data read packet is used to request the external controller to read data in an indicated storage location, and a packet format of the data read packet complies with a packet format specified in the memory-semantic network protocol; receiving, by the server, indication information sent by the external controller, where the indication information is used to indicate a response status of the external controller to the data read packet; and determining, by the server, the response status of the external controller to the data read packet based on the indication information, and performing fault tolerance processing when the response status is an abnormal response.

20 Claims, 3 Drawing Sheets

(56) References Cited

U.S. PATENT DOCUMENTS

2018/0136864 A1    5/2018  Wang et al.
2019/0007310 A1*   1/2019  Das Sharma ........... H04L 49/60

FOREIGN PATENT DOCUMENTS

| CN | 102508733 A | 6/2012 |
| CN | 102568521 A | 7/2012 |
| CN | 103019875 A | 4/2013 |
| CN | 103577341 A | 2/2014 |
| CN | 101692351 A | 4/2014 |
| CN | 105190766 A | 12/2015 |
| CN | 107430537 A | 12/2017 |
| CN | 107506266 A | 12/2017 |
| CN | 107992376 A | 5/2018 |
| CN | 108073805 A | 5/2018 |

* cited by examiner

FAULT TOLERANCE PROCESSING METHOD, APPARATUS, AND SERVER

CROSS-REFERENCE TO RELATED APPLICATIONS

This is a continuation of International Patent Application No. PCT/CN2018/093400, filed on Jun. 28, 2018, the disclosure of which is hereby incorporated by reference in its entirety.

FIELD

This disclosure relates to the field of information technologies, and more specifically, to a fault tolerance processing method, apparatus, and server.

BACKGROUND

A new storage class memory (SCM) has met a commercialization standard. For example, 3D XPoint is commercialized, and an access delay of the SCM of 200 to 500 nanoseconds (ns) can be achieved.

Access delays of a conventional InfiniBand (TB) network, a remote direct memory access (RDMA) network, and an RDMA over Converged Ethernet network are generally 10 microseconds (µs). The access delays of these networks do not match an access delay of the new SCM. Therefore, a memory-semantic network protocol emerges.

In a memory-semantic network, communication between different servers is cross-network communication, and switching between the different servers needs to be performed by using a plurality of physical media (for example, switches or servers configured to forward a communication message) and even a plurality of multi-layer switches, resulting in a relatively high probability of congestion or abnormality in the network during the cross-network communication.

In existing data processing, a data read access mechanism used by a processor considers by default that data read access should be successful. However, when a storage medium is abnormal, an external controller returns invalid data as a response to a data read packet. When a timeout occurs in the data read packet, an internal controller generates invalid data as a response to the data read packet. In the foregoing abnormal cases, when the processor needs to consume the invalid data, for example, perform an operation on the invalid data, a data access system is triggered to restart due to invalidity.

SUMMARY

This disclosure provides a fault tolerance processing method, and the method can effectively reduce a probability of a restart of a data access system due to invalidity.

According to a first aspect, a fault tolerance processing method is provided, and the method is applied to a server. The server communicates with an external controller by using a memory-semantic network protocol, and the external controller is located outside the server. The method includes: The server sends a data read packet to the external controller, where the data read packet is used to request the external controller to read data in an indicated storage location, and a packet format of the data read packet complies with a packet format specified in the memory-semantic network protocol; the server receives indication information sent by the external controller, where the indication information is used to indicate a response status of the external controller to the data read packet; and the server determines the response status of the external controller to the data read packet based on the indication information, and performs fault tolerance processing when the response status is an abnormal response.

When performing data read access, before a processor core performs an operation on invalid data returned by the external controller, the server determines a response status, to the data read packet, of a server that is requested to read data, and performs the fault tolerance processing when the response status is the abnormal response, thereby avoiding a restart of a data access system due to invalidity caused by performing an operation on the invalid data when the abnormal response is not detected.

In a possible implementation, the server includes a processor. The processor includes an internal controller and a processor core, and the processor core communicates with the internal controller by using an internal bus network protocol. That the server sends the data read packet to the external controller includes: The internal controller performs format conversion on a packet from the processor to generate the data read packet, and the internal controller sends the data read packet to the external controller.

In a possible implementation, that the server determines the response status of the external controller to the data read packet includes: The internal controller determines a data read result of the external controller based on the indication information, where the data read result is used to indicate whether the external controller successfully reads the data; the internal controller generates a notification message based on the data read result, where the notification message includes a response status identifier, and the response status identifier indicates that the external controller fails to read the target data in storage space indicated by the data read packet.

When the abnormal response (for example, a target data read failure) occurs in data access, the notification message carrying the response status identifier is generated to distinguish between different faults, and the response status identifier is stored in a register of the processor core. In addition, an instruction is added to an internal memory of the server, so that the processor core executes the instruction to read the response status identifier from the register, to ensure that before performing the operation on the invalid data, the processor core may determine the response status of the external controller to the data read packet based on the response status identifier. When the response status is the abnormal response, the fault tolerance processing can be performed for the abnormal response, thereby avoiding a restart of the data access system due to invalidity caused by performing an operation on the invalid data when the abnormal response is not detected.

In a possible implementation, the method further includes: The internal controller sends the notification message to the processor; the processor core obtains the response status identifier from the notification message; the processor stores the response status identifier into the register of the processor; and the processor core obtains the response status identifier from the register. That the server determines the response status of the external controller to the data read packet based on the indication information includes: The processor core determines the response status of the external controller to the data read packet based on the response status identifier.

Optionally, only one register in the processor core is used to store the response status identifier. The register may be any one of original registers of the processor, and may store the response status identifier by using only some fields in the register. Alternatively, the register is a register newly added to the processor, and the register may be dedicated for storing the identifier.

The register may be configured to store a plurality of response status identifiers carried in a plurality of notification messages returned by the internal controller for a plurality of data read packets (for example, the plurality of data read packets include the foregoing data read packet) of the processor core.

In this case, the plurality of identifiers may be stored in an overlay storage manner. After the processor core receives the notification message, the identifier obtained from the register is the identifier carried in the notification message.

The plurality of identifiers may not be stored in an overlay storage manner. For example, fields may be separately allocated, in the register, for the plurality of identifiers corresponding to the plurality of data read packets sent by the processor core. The allocated fields are used to store the plurality of identifiers. Association relationships between the plurality of data read packets and the fields allocated for the identifiers corresponding to the plurality of data read packets are created. When obtaining the identifier carried in the notification message from the register, the processor core may obtain, based on the association relationship, the response status identifier carried in the notification message from a corresponding field in the register.

Optionally, the processor core includes at least two registers configured to store the response status identifier carried in the notification message returned by the internal controller. The at least two registers may be original registers of the processor, and may store the identifier by using only some fields in the at least two registers. Alternatively, the at least two registers are registers newly added to the processor core, and may be dedicated for storing the identifier.

The registers may be configured to store a plurality of response status identifiers carried in a plurality of notification messages returned by the internal controller for a plurality of data read packets (for example, the plurality of data read packets include the converted data read packet) of the processor core.

In this case, the identifiers are stored in different registers. For example, the plurality of identifiers may be in a one-to-one correspondence with the plurality of registers, that is, one register is configured to store only one identifier. In this case, association relationships between the plurality of data read packets and the plurality of registers may be created.

When obtaining the identifier carried in the notification message, the processor core may determine, based on the association relationship, a register corresponding to the notification message, and obtain the response status identifier from the register.

For another example, the identifiers have a many-to-one relationship with the plurality of registers. In other words, at least two identifiers are stored in one register. In this case, association relationships among the plurality of data read packets, the plurality of registers, and fields in the registers that are used to store the identifiers may be created.

When obtaining the notification message, the processor core may determine, based on the association relationship, a register corresponding to the notification message, and further determine a field that is in the register and that is used to store the identifier carried in the notification message, so as to obtain the identifier carried in the notification message from corresponding storage space in the register.

By enabling the processor core to store the response status identifier obtained from the notification message into the register, and adding an instruction to the internal memory of the server, the processor core executes the instruction to obtain the response status identifier from the register, so that before performing the operation on the returned invalid data, the processor core can determine the response status of the external controller to the data read packet based on the response status identifier. When the response status is the abnormal response, the fault tolerance processing is performed for the abnormal response, thereby avoiding a restart of the data access system due to invalidity caused by performing an operation on the invalid data when the abnormal response is not detected.

In a possible implementation, the fault tolerance processing includes degraded read or replica read.

When the processor core determines that the external controller fails to read the target data in the storage space indicated by the data read packet, the processor may implement the data read access in a degraded read manner or in a replica read manner.

According to a second aspect, a fault tolerance processing method is provided, and the method is applied to a server. The server communicates with an external controller by using a memory-semantic network protocol, and the external controller is located outside the server. The method includes: The server sends a data read packet to the external controller, where the data read packet includes destination address information of to-be-read data, the destination address information is used to indicate a storage location of the to-be-read data, and a packet format of the data read packet complies with a packet format specified in the memory-semantic network protocol; and the server determines that a response status of the external controller to the data read packet is a response timeout, and performs fault tolerance processing when the response status is a response timeout.

When performing data read access, before a processor core performs an operation on invalid data returned by the external controller, the server determines a response status, to the data read packet, of a server that is requested to read data, and performs fault tolerance processing when the response status is a response timeout, thereby avoiding a restart of a data access system due to invalidity caused by performing an operation on the invalid data when the response timeout is not detected.

In a possible implementation, the server includes a processor. The processor includes an internal controller and the processor core, and the processor core communicates with the internal controller by using an internal bus network protocol. That the server sends the data read packet to the external controller includes: The internal controller performs format conversion on a packet from the processor to generate the data read packet, and the internal controller sends the data read packet to the external controller.

In a possible implementation, that the server determines that the response status of the external controller to the data read packet is a response timeout includes: When duration recorded by a timer in the internal controller is greater than or equal to a first threshold, and if the internal controller does not receive indication information returned by the external controller, the internal controller determines that the response status of the external controller to the data read packet is a response timeout, and generates a notification message, where the notification message includes a response status identifier, and the response status identifier is used to indicate that the response status of the external controller to the data read packet is a response timeout.

When a response timeout occurs in data access, the notification message carrying the response status identifier is generated to indicate that the response status of the external controller to the data read packet is a response timeout, and the response status identifier is stored in a register of the processor core. In addition, an instruction is added to an internal memory of the server, so that the processor core executes the instruction to read the response status identifier from the register, to ensure that before performing the operation on the invalid data, the processor core may determine the response status of the external controller to the data read packet based on the response status identifier. When the response status is the timeout, the fault tolerance processing can be performed for the abnormal response, thereby avoiding a restart of the data access system due to invalidity caused by performing an operation on the invalid data when the abnormal response is not detected.

In a possible implementation, the method further includes: The internal controller sends the notification message to the processor core; the processor core obtains the response status identifier from the notification message; the processor core stores the response status identifier into a register of the processor; the processor core obtains the response status identifier from the register; and the processor core determines, based on the response status identifier, that the response status of the external controller to the data read packet is a response timeout.

In a possible implementation, when the response status identifier indicates that the timeout occurs during reading the target data by the external controller in the storage space indicated by the data read packet, the fault tolerance processing includes retry, degraded read, or replica read.

When the processor core determines that the timeout occurs during reading the target data by the external controller in the storage space indicated by the data read packet, the processor may implement the data read access in a retry manner, in a degraded read manner, or in a replica read manner.

According to a third aspect, a fault tolerance processing apparatus is provided, and the apparatus is configured to perform the method according to any one of the first aspect or the possible implementations of the first aspect. Specifically, the apparatus may include a module that is configured to perform the method according to any one of the possible implementations of the first aspect or the second aspect.

According to a fourth aspect, a server is provided. The server communicates with an external controller by using a memory-semantic network protocol, and the external controller is located outside the server. The server includes a processor, and the processor includes an internal controller and a processor core. The internal controller is configured to perform the operation steps of the method performed by the internal controller according to any one of the first aspect or the possible implementations of the first aspect, and the processor core is configured to perform the operation steps of the method performed by the processor core according to any one of the first aspect or the possible implementations of the first aspect.

According to a fifth aspect, a computer-readable storage medium is provided. The computer-readable storage medium stores an instruction, and when the instruction runs on a computer, the computer is enabled to perform the method according to any one of the possible implementations of the first aspect or the second aspect.

According to a sixth aspect, a computer program product including an instruction is provided, and when the computer program product runs on a computer, the computer is enabled to perform the method according to any one of the possible implementations of the first aspect or the second aspect.

DETAILED DESCRIPTION

The following describes the technical solutions in the embodiments with reference to the accompanying drawings.

Figure 1:
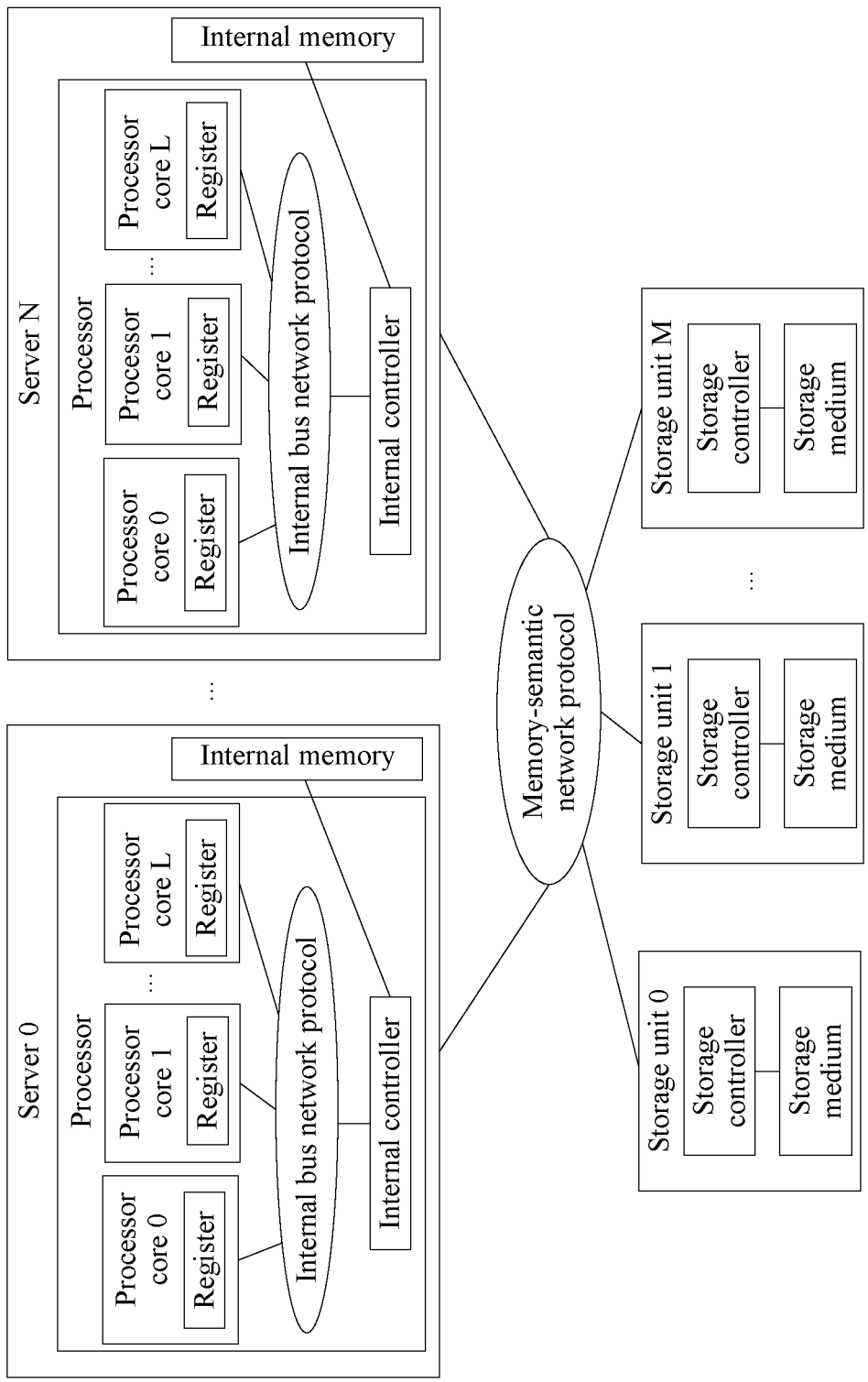
FIG. 1 is a schematic structural diagram of a data access system.

FIG. 1 shows a data access system according to an embodiment. The data access system includes a plurality of servers (for example, a server 0 to a server N, where N≥2). Any two servers communicate with each other by using a memory-semantic network protocol, and memory-semantic network may be a generation (Gen-z) network.

In addition, the data access system further includes a resource pool comprising a plurality of storage units (for example, a storage unit 0 to a storage unit M, where M≥2). Any server from the server 0 to the server N may access data in any storage unit in the resource pool by using the memory-semantic network protocol. The storage unit may be a new SCM. For example, the SCM is 3D XPoint.

The memory-semantic network includes a plurality of cascaded switches, which are not shown in FIG. 1. Different servers communicate with each other through different ports on the switches, and the servers communicate with the storage units in the resource pool through different ports on the switches.

Each server in FIG. 1 may include a processor and an internal memory. The processor may be a general central processing unit (CPU), or may be a system on chip (SoC).

In this embodiment, that the processor is the SoC is used as an example for description. An instruction set based on an X86 architecture may be supported in running on the SoC, and an instruction set based on an advanced reduced instruction set computer machine (ARM) architecture may also be supported in running on the SoC. For example, the internal memory may be a dual in-line memory module (DIMM).

The SoC is integrated with a plurality of processor cores (for example, a processor core 0 to a processor core L, where L≥2) and an internal controller. One or more registers (only one register is shown in FIG. 1) are deployed on each processor core. The internal controller is configured to enable the plurality of processor cores to access data in another server or a local resource pool, and may be further configured to enable the plurality of processor cores to access data in the internal memory. The plurality of processor cores in the server communicate with the internal controller by using an internal bus network protocol.

Optionally, the internal controller may include two controllers, for example, a first internal controller and a second internal controller. The first internal controller is configured to enable the plurality of processor cores to access data in another server or a local resource pool, and the second internal controller is configured to enable the plurality of processor cores to access data in the internal memory. The plurality of processor cores in the server communicate with the first internal controller and the second internal controller by using the internal bus network protocol. For example, the first internal controller may be a Gen-Z controller, and the second internal controller may be an internal memory controller (IMC).

Any storage unit in the resource pool includes a storage controller and a storage medium. The storage controller is configured to access data in the storage medium in the storage unit according to a received data access request from another server. For example, the storage unit in the resource pool may be an SCM, and the SCM may be a 3D XPoint memory. The storage controller has functions of protocol conversion and media access.

To save computing resources of the processor in the server, a field-programmable gate array (FPGA) or other hardware may also be configured to perform all operations of the processor in this embodiment. For example, at least one processor core in the plurality of processor cores may be replaced with an FPGA or other hardware.

One data access process includes a plurality of instructions. A processor core 0 to a processor core L are configured to execute the plurality of instructions stored in the internal memory concurrently, and the plurality of instructions may correspond to a plurality of application programs. In a conventional technical solution, a data read access mechanism used by the processor core considers by default that data read access should be successful, and no abnormality check processing is performed on data returned by an external controller. If the returned data is invalid data, when the processor core consumes the invalid data, for example, performs an operation (to be specific, reads the data in the storage unit) on the invalid data, the data access system is triggered to restart due to invalidity.

The embodiments provide a fault tolerance processing method. In the method, when an abnormal response occurs (for example, a response timeout or a target data read failure) in data access, the external controller sends indication information and invalid data generated according to a preset rule to the internal controller of the server. The internal controller generates a response status identifier based on the indication information sent by the external controller, distinguishes between different faults by using the response status identifier, stores the response status identifier into a register of a processor core, and stores the invalid data into an internal memory of the server. The target data is data in a storage unit to be accessed by a data read packet. The invalid data includes data generated by the external controller according to the preset rule when the storage unit is abnormal, and data generated by the internal controller according to the preset rule when a timeout occurs in the data access. The preset rule may be that fields for storing the target data by default in a packet corresponding to a returned result are all set to 0 or 1. In addition, an instruction is added to the internal memory of the server, so that the processor core executes the instruction to read the response status identifier from the register, so as to ensure that the processor core can determine a response status of the external controller to the data read packet based on the response status identifier before performing an operation on the invalid data. In the conventional technical solution, the processor core considers by default that the data read access is successful, and does not check whether the returned result is invalid data. Compared with the conventional technical solution, in this embodiment, before performing an operation on the invalid data, the processor core pre-identifies the abnormal response by reading the response status identifier, and performs fault tolerance processing, thereby avoiding a restart of the data access system due to invalidity caused by performing an operation on the invalid data when the abnormal response is not detected.

It should be noted that in the conventional technical solution, the processor core receives the returned result of the data read access regardless of whether the data read access succeeds. When the data read access succeeds, the returned result is the read target data. When a fault occurs in a storage medium in which the target data of the data read access is located, the returned result is the invalid data generated by the external controller according to the preset rule. When the timeout occurs in the data read access, the returned result is the invalid data generated by the internal controller according to the preset generation rule. The returned result is stored into an internal memory of a server for sending a data read access request.

The following describes the fault tolerance processing method in the embodiments by using an example in which a processor core in a server executes an instruction of an application program to access data in another server or the resource pool, and a server includes one internal controller.

It should be noted that, for the server in the system architecture shown in FIG. 1, if the server 0 is a server sending a data read request, and the server N is a server receiving the request, an internal controller in the server N is an external controller for the server 0. In the following description of the embodiments, that the server 0 is a server sending a data read request is used as an example for description. In this case, the external controller includes a storage controller of any storage unit in the resource pool and the internal controller in the server N.

In the data access system described in FIG. 1, a processor core in any server is configured to execute an instruction stored in the internal memory to implement data read access, and perform fault tolerance processing by using the fault tolerance processing method provided in the embodiments of when a fault occurs in the data read access.

Figure 2:
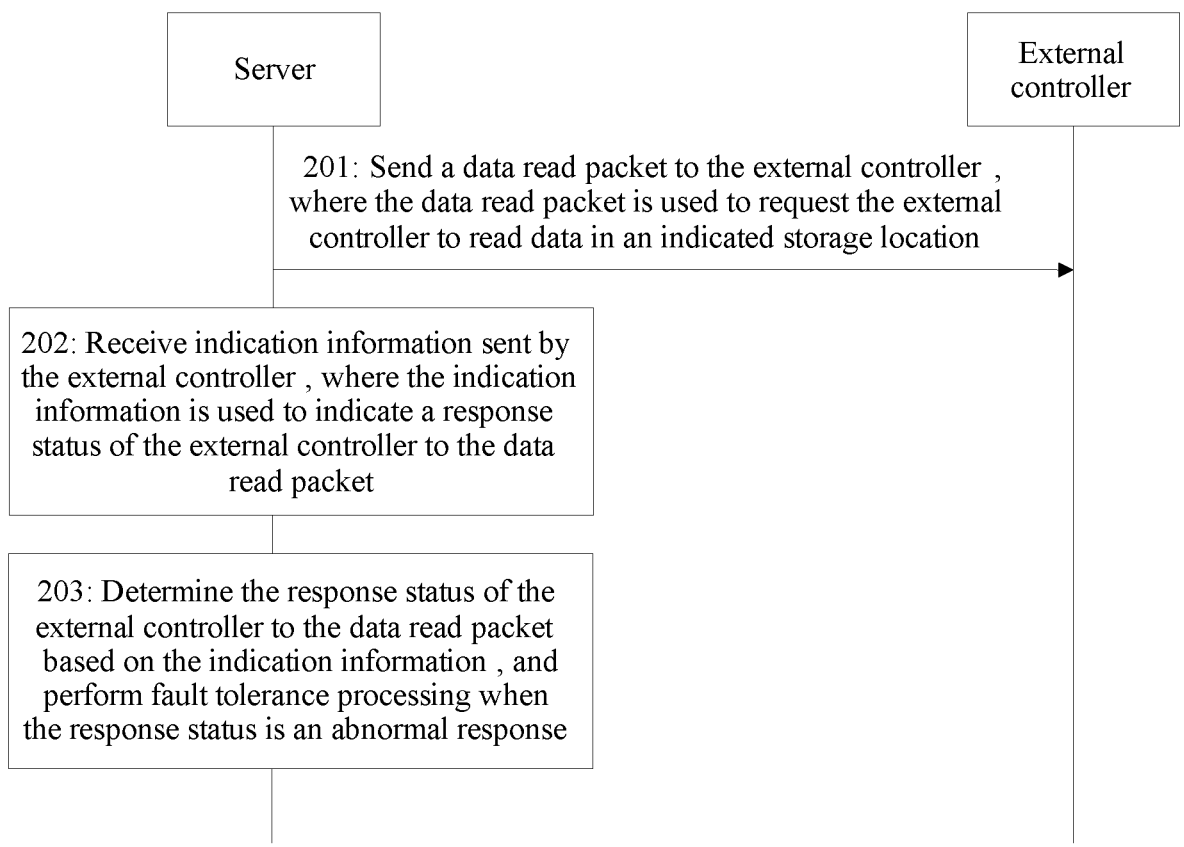
FIG. 2 is a schematic flowchart of a fault tolerance processing method.

FIG. 2 is a schematic flowchart of a fault tolerance processing method 200 according to an embodiment. The method 200 includes at least the following steps.

201: A server sends a data read packet to an external controller, where the data read packet is used to request the external controller to read data in an indicated storage location, a packet format of the data read packet complies with a packet format specified in the memory-semantic network protocol, and the external controller is located outside the server.

For example, the server includes a processor, and the processor includes an internal controller and a processor core. The processor core communicates with the internal controller by using an internal bus network protocol. That the server sends the data read packet to the external controller includes: The internal controller performs format conversion on a packet from the processor core to generate the data read packet, and sends the data read packet to the external controller.

Specifically, the processor core in the server performs a data read request from a client, and generates the data read packet based on the data read request. The data read request is sent in a packet form to a remote server or a storage unit, and is used to request to read data (for example, target data) in another server or in a storage unit in a resource pool.

For example, the processor core sends the data read packet to the internal controller, and the data read packet is used to request an internal controller in a peer server (for example, a server that is requested to read data) or a storage controller in a storage unit (for example, a storage unit that is requested to read data) in a peer resource pool to read the target data in storage space indicated in destination address information of to-be-read data that is carried in the data read packet.

The internal controller performs format conversion on the received data read packet. For example, the internal controller converts a format of the data read packet from a format specified in the internal bus network protocol to a format specified in the memory-semantic network protocol, and sends a converted data read packet to a switch through a port that is on the switch and that is used to communicate with a server on which the external controller is located. The switch parses the converted data read packet, determines, based on destination address information of to-be-read data carried in the converted data read packet, a port that is on the switch and that is used to communicate with a storage unit that is requested to read the data, and sends the converted data read packet to the external controller through the port.

The internal bus network protocol may be any one of a quick path interconnect (QPI) network protocol, a hyper transport (HT) network protocol, or a HiSilicon coherent connect specification (HCCS) network protocol.

That the format of the packet from the processor core is converted from a packet format specified in the HT network protocol to the packet format specified in the memory-semantic network protocol is used as an example to briefly describe a process of converting the format of the packet from the processor core.

Specifically, the format of the packet from the processor core complies with the packet format specified in the HT network protocol. A destination address carried in the packet from the processor core is carried in byte 4_bit [0] to byte 4_bit [7], byte 5_bit [0] to byte 5_bit [7], byte 6_bit [0] to byte 6_bit [7], and byte 7_bit [0] to byte 7_bit [7]. Byte represents a byte, and bit represents a bit included in a byte. Operation code is carried in byte 0_bit [0] to byte 0_bit [5], and the operation code indicates a specific type of a read operation in the packet request from the processor core.

After format conversion is performed on the packet from the processor core, a format of a generated data read packet complies with the packet format specified in the memory-semantic network protocol. A destination address carried in the converted data read packet is carried in byte 0_bit [4] to byte 0_bit [7], byte 1_bit [0] to byte 0_bit [7], byte 2_bit [0] to byte 2_bit [7], byte 3_bit [0] to byte 3_bit [7], byte 8_bit [0] to byte 8_bit [7], and byte 9_bit [0] to byte 9_bit [3], and operation code is carried in byte 4_bit [0] to byte 4_bit [3].

202: The server receives indication information sent by the external controller, where the indication information is used to indicate a response status of the external controller to the data read packet.

203: The server determines the response status of the external controller to the data read packet based on the indication information, and performs fault tolerance processing when the response status is an abnormal response.

For example, that the server determines the response status of the external controller to the data read packet includes: The internal controller determines a data read result of the external controller based on the indication information to generate a notification message, where the notification message includes a response status identifier, and the response status identifier is used to indicate the response status of the external controller to the data read packet.

Specifically, the internal controller determines whether the external controller successfully reads the target data in the storage space indicated by the data read packet, and generates the notification message based on the data read result of the external controller for the storage space indicated by the converted data read packet. The notification message includes the response status identifier, and the response status identifier is used to indicate the response status of the external controller to the data read packet.

The response status of the external controller to the data read packet may include any one of a response timeout, a data read failure, and a target data read success. The following describes in detail methods for determining the foregoing three types of response status and a method for generating a notification message for each type of response status.

The internal controller may determine, based on the indication information sent by the external controller, two types of response status: a data read failure and a target data read success. The internal controller may determine, by using another method, that the response status of the external controller to the data read packet is a response timeout. The following separately describes the foregoing cases.

Scenario 1: The response status of the external controller to the data read packet is a data read failure.

The internal controller determines that the response status of the external controller to the data read packet is a target data read failure, and generates a notification message. The notification message includes a response status identifier, and the response status identifier indicates that the response status of the external controller to the converted data read packet is a data read failure.

Specifically, the internal controller sends the data read packet to the external controller, and the external controller parses the converted data read packet to read the target data in the storage space indicated by a destination address carried in the converted data read packet.

If the external controller finds that a storage medium for storing the target data is abnormal when reading the target data, and cannot read the target data, the external controller generates indication information. The indication information is used to indicate that the response status of the external controller to the data read packet is a target data read failure.

For example, the indication information carries a response fault indication. The response fault indication may be NULL, and is used to indicate that the response status of the external controller to the data read packet is a target data read failure. In other words, the response fault indication indicates that the processor core fails to access data in a peer server or in a storage unit in a peer resource pool.

The external controller sends the indication information to the internal controller. When determining, based on the indication information, that the indication information carries the response fault indication, the internal controller determines that the external controller fails to read the target data in the storage space indicated by the destination address of the data read packet.

The internal controller generates the notification message based on the indication information. The notification message includes the response status identifier, and the response status identifier is used to indicate, to the processor core, that the processor core fails to access the data in the peer server or in the storage unit in the peer resource pool. The internal controller sends the notification message to the processor core.

Optionally, the notification message may be sent by the internal controller in a form of an internal bus protocol packet to the processor core.

For example, if the internal controller communicates with the processor core by using the HT network protocol, a format of a packet that is generated by the internal controller and that carries the notification message is a packet format of the HT network protocol. A packet complying with the HT network protocol includes four bytes (for example, byte 0 to byte 3), and each byte includes eight bits (for example, bit 0 to bit 7). Byte 0_bit [6] and byte 1_bit [5] are reserved bits.

When generating, based on the HT network protocol, the packet that carries the notification message, the internal controller may add the response status identifier at byte 0_bit [6] and byte 1_bit [5] of the packet. For example, when values of the byte 0_bit [6] and the byte 1_bit [5] are "10", it indicates that the processor core fails to access the data in the peer server or in the storage unit in the peer resource pool.

Scenario 2: The response status of the external controller to the data read packet is a target data read success.

The internal controller determines that the response status of the external controller to the data read packet is a target data read success, and generates a notification message. The notification message includes a response status identifier, and the response status identifier indicates that the response status of the external controller to the converted data read packet is a target data read success.

Specifically, the internal controller sends the converted data read packet to the external controller, and the external controller parses the converted data read packet to read the target data in the storage space indicated by the destination address carried in the converted data read packet.

If the external controller successfully reads the target data in the storage space indicated by the converted data read packet, the external controller generates indication information, and the indication information is used to indicate that the external controller successfully reads the target data in the storage space indicated by the data read packet.

For example, the indication information carries a response success indication, and the response success indication is used to indicate that the external controller successfully reads the target data in the storage space indicated by the data read packet. In other words, the response success indication indicates that the processor core successfully accesses the data in the peer server or in the storage unit in the peer resource pool.

The external controller sends the indication information to the internal controller. The internal controller determines, according to the response success indication included in the indication information, that the external controller successfully reads the target data in the storage space indicated by the data read packet.

The internal controller generates the notification message based on the indication information. The notification message includes the response status identifier, and the response status identifier is used to indicate, to the processor core, that the processor core successfully accesses the data in the peer server or in the storage unit in the peer resource pool. The internal controller sends the notification message to the processor core.

Optionally, the notification message may be sent by the internal controller in the form of the internal bus protocol packet to the processor core.

For example, if the format of the packet that is generated by the internal controller and that carries the notification message complies with the packet format of the HT network protocol, the internal controller may add the response status identifier at byte 0_bit [6] and byte 1_bit [5] of the packet when generating the packet that carries the notification message. For example, when values of the byte 0_bit [6] and the byte 1_bit [5] are "00", it indicates that the processor core successfully accesses the data in the peer server or in the storage unit in the peer resource pool.

In scenario 1 and scenario 2, the foregoing describes the methods in which the internal controller determines the two types of response status: the target data read success and the data read failure, based on the indication information sent by the external controller. The following describes a method for determining, by the internal controller, that the response status of the external controller to the data read packet is a response timeout.

Scenario 3: The response status of the external controller to the converted data read packet is a response timeout.

The internal controller determines that the response status of the external controller to the data read packet is a response timeout, and generates a notification message. The notification message includes a response status identifier, and the response status identifier indicates that the response status of the external controller to the converted data read packet is a response timeout.

Specifically, before or after sending the data read packet to the external controller, or when sending the data read packet to the external controller, the internal controller starts a timer for timing. For example, the timer performs timing in an ascending manner from a moment 0 or in a descending manner from a maximum moment. If a value in the timer decreases to 0 or increases to the maximum moment, it is considered that the timer expires.

At this time, if the internal controller still does not receive indication information sent by the external controller for the data read packet, the internal controller generates the notification message for the data read packet. The notification message includes the response status identifier, and the response status identifier indicates that the response status of the external controller to the converted data read packet is a response timeout, that is, indicates that a timeout occurs in data access by the processor core to the peer server or to the storage unit in the peer resource pool. The internal controller sends the notification message to the processor core.

Optionally, the notification message may be sent by the internal controller in the form of the internal bus protocol packet to the processor core.

For example, if the format of the packet that is generated by the internal controller and that carries the notification message complies with the packet format of the HT protocol, the internal controller may add the response status identifier at byte 0_bit [6] and byte 1_bit [5] of the packet when generating the packet that carries the notification message. For example, when values of the byte 0_bit [6] and the byte 1_bit [5] are "01", it indicates that a timeout occurs in accessing, by the processor core, the data in the peer server or in the storage unit in the peer resource pool. It should be noted that when the response status of the data read packet is a response timeout, the internal controller may generate invalid data according to a preset rule. The invalid data is used as a response to the data read packet, and is sent by the internal controller to the processor core. The processor core then stores the invalid data into an internal memory.

It should be noted that when the foregoing scenario 1 and scenario 3 occur, the server performs the fault tolerance processing. In scenario 2, the fault tolerance processing does not need to be performed.

In a possible implementation, in addition to that the external controller determines the response status of the external controller to the data read packet according to the response fault indication or the response success indication of the indication information, in this embodiment, the internal controller may further send, to the processor core, the packet carrying the indication information in scenario 1 or scenario 2. The processor core stores the response fault indication carried in the packet carrying the indication information in scenario 1, or the response success indication carried in the packet carrying the indication information in scenario 2 into a cache, which is not shown in the processor core in FIG. 1. An instruction is added to an instruction stored in the internal memory of the server, so that the processor core can obtain, from the cache, the response fault indication or the response success indication included in the packet carrying the indication information.

After receiving the invalid data that is generated according to the preset rule and that is from the external controller, the internal controller sends the invalid data to the processor core, and the processor core stores the invalid data into the internal memory.

Before performing an operation on the invalid data, the processor core first performs the instruction stored in the internal memory to obtain, from the cache, the response fault indication or the response success indication included in the packet carrying the indication information, and performs the fault tolerance processing on a response fault for the response fault indication.

In a possible implementation, the method further includes: The internal controller sends the notification message to the processor core. Specifically, the processor core obtains the response status identifier from the notification message, and stores the response status identifier into a register of the processor core. Before processing the invalid data, the processor core obtains the response status identifier from the register, and determines the response status of the external controller to the data read packet based on the response status identifier.

Specifically, after determining the response status of the external controller to the data read packet, the internal controller generates the notification message based on the response status, and sends the notification message to the processor core. The response status identifier carried in the notification message indicates the response status of the external controller to the data read packet. The processor core determines the response status of the external controller to the data read packet based on the response status identifier.

The notification message carrying the response status identifier is generated, and the response status identifier indicates that an abnormal response occurs in data access, so that the processor core requesting the data access performs an operation on the invalid data. Before the operation, the response status of the external controller to the data read packet can be determined based on the response status identifier, and when the response status is the abnormal response, fault tolerance processing is performed for the abnormal response, thereby avoiding a restart of the data access system due to invalidity caused by performing an operation on the invalid data when the abnormal response is undetected.

The following further explains how the processor core determines, based on the notification message, the response status of the external controller to the converted data read packet and the fault tolerance processing method in the embodiments.

Specifically, after receiving a notification message from the internal controller, the processor core obtains a response status identifier (for example, the response status identifier may be any response status identifier in the foregoing scenario 1 to scenario 3) carried in the notification message, and stores the response status identifier in the register of the processor core.

It should be noted that in this embodiment, if the notification message is sent by the internal controller in the form of the internal bus protocol packet to the processor core, when receiving a packet carrying the notification message, the processor core first needs to parse the packet to obtain a response status identifier carried in the packet, and stores the response status identifier in the register of the processor core.

The following describes several manners in which the processor core stores a response status identifier into the register of the processor core.

Manner 1: A plurality of processor cores store, by using only one register, a response status identifier carried in a notification message.

The register may be any one of original registers of the processor core, and may store, by using only some fields in the register, the response status identifier carried in the notification message. Alternatively, the register is a register newly added to the processor core, and may be dedicated for storing the response status identifier carried in the notification message.

Specifically, after receiving the notification message sent by the internal controller, the processor core stores the response status identifier carried in the notification message into the register, and further obtains the response status identifier carried in the notification message from the register by executing the instruction.

The register may be configured to store a plurality of response status identifiers carried in a plurality of notification messages (for example, the notification messages include the notification message in the method 200) returned by the external controller for a plurality of data read packets (for example, the data read packets include the data read packet in the method 200) of the processor core. In this case, the plurality of response status identifiers may be stored in an overlay storage manner. After the processor core successfully receives the notification message, the response status identifier obtained from the register is the response status identifier carried in the notification message.

Optionally, the plurality of response status identifiers may not be stored in an overlay storage manner. For example, fields may be separately allocated, in the register, for the plurality of response status identifiers corresponding to the plurality of data read packets sent by the processor core. The allocated fields are used to store the plurality of response status identifiers. Association relationships between the plurality of data read packets and the fields allocated for the response status identifiers corresponding to the plurality of data read packets are created. When obtaining the response status identifier carried in the notification message from the register, the processor core may obtain, based on the association relationship, the response status identifier carried in the notification message from a corresponding field in the register.

Manner 2: The processor cores store the response status identifier carried in the notification message by using two or more registers.

The at least two registers may be original registers of the processor core, and may store the response status identifier by using only some fields in the at least two registers. Alternatively, the at least two registers are registers newly added to the processor core, and may be dedicated for storing the response status identifier.

Specifically, after receiving the notification message sent by the internal controller, the processor core stores the response status identifier carried in the notification message into the register, and further obtains the response status identifier carried in the notification message from the register by executing the instruction.

The registers may be configured to store a plurality of response status identifiers carried in a plurality of notification messages returned by the internal controller for a plurality of data read packets (for example, the data read packets include the converted data read packet) of the processor core. In this case, the response status identifiers are stored in different registers. For example, the plurality of response status identifiers may be in a one-to-one correspondence with the plurality of registers, that is, one register is configured to store only one response status identifier. In this case, association relationships between the plurality of data read packets and the plurality of registers may be created.

When obtaining the response status identifier carried in the notification message, the processor core may determine, based on the association relationship between the packets and the registers, a register corresponding to the notification message, and obtain the response status identifier carried in the notification message from the register.

For another example, the response status identifiers have a many-to-one relationship with the plurality of registers. In other words, at least two response status identifiers are stored in one register. In this case, association relationships among the plurality of data read packets, the plurality of registers, and fields in the registers that are used to store the response status identifiers may be created.

When obtaining the response status identifier carried in the notification message, the processor core may determine, based on the association relationship between the packets and the registers, a register corresponding to the notification message, and further determine a field that is in the register and that is used to store the response status identifier carried in the notification message, so as to obtain the response status identifier carried in the notification message from corresponding storage space in the register.

It should be noted that, the foregoing is merely described by using an example in which mapping relationships between the plurality of data read packets and the plurality of registers and/or the fields allocated for the response status identifiers corresponding to the plurality of data read packets are created. However, this embodiment is not limited thereto. For example, mapping relationships between the plurality of notification messages and the plurality of registers and/or the fields allocated for the response status identifiers carried in the plurality of notification messages may be further created.

It should be further noted that in this embodiment, in addition to the foregoing creation of the mapping relationships, the processor core may obtain the response status identifier carried in the notification message from the register in a following manner.

When storing the response status identifier carried in the notification message into the register, the processor core may record a storage location of a field that is in the register and that is used to store the response status identifier, so that the processor core obtains, based on the storage location, the response status identifier carried in the notification message from the register.

It should be further noted that, in this embodiment, the register is closer to the processor core in a PCIe bus structure. Therefore, compared with storing the response status identifier carried in the notification message into the internal memory (cache), storing the response status identifier into the register in the processor core can enable the processor core to quickly obtain the response status identifier from the register, determine the response status of the external controller to the converted data read packet based on the response status identifier, and quickly perform fault tolerance processing for the abnormal response when the response status is the abnormal response.

The following describes a method for determining the response status of the external controller to the data read packet based on the notification message.

In this embodiment, an instruction is added to the instruction stored in the internal memory of the server, and execution of the instruction enables the processor core to obtain the response status identifier carried in the notification message from the register.

Therefore, before performing an operation on the invalid data, the processor core first performs the instruction stored in the internal memory to obtain the response status identifier from the register, determines the response status of the external controller to the data read packet based on the response status identifier, and performs fault tolerance processing for a response timeout or a target data read failure when the response status is the response timeout or the target data read failure.

For example, when a value of the response status identifier obtained by the processor core from the register is 01, the processor core determines, based on the specific value of the response status identifier, that a timeout occurs in accessing data in the peer server or in the storage unit in the peer resource pool. In this case, the processor determines that returned data is invalid data, skips performing the operation on the invalid data, and accesses the data in the peer server or in the storage unit in the peer resource pool in a retry manner, in a degraded read manner, or in a replica read manner.

For another example, when the value of the response status identifier obtained by the processor core from the register is 10, the processor core determines, based on the specific value of the response status identifier, that the external controller fails to read the target data in storage space indicated by a destination address carried in the data read packet. In this case, the processor core determines that returned data is invalid data, skips performing the operation on the invalid data, and accesses the data in the peer server or in the storage unit in the peer resource pool in a retry manner, in a degraded read manner, or in a replica read manner.

For another example, when the value of the response status identifier obtained by the processor core from the register is 00, the processor core determines, based on the specific value of the response status identifier, that the external controller successfully reads the target data in the storage space indicated by the destination address carried in the data read packet. In this case, the processor core further performs the operation on the target data returned by the external controller.

The following describes several methods for performing fault tolerance processing for a response timeout or a target data read failure when the response status of the external controller to the data read packet is the response timeout or the target data read failure.

Method 1: Retry Processing

Specifically, when determining that a timeout fault occurs during reading target data from a peer server, the processor core skips performing an operation on the invalid data, and may send a data read packet to the peer server again. The data read packet is used to request the peer server to read the target data in the storage space indicated by the destination address carried in the data read packet.

Method 2: Degraded Read Processing

The degraded read processing means that the target data and data associated with the target data are respectively stored in different servers. The data associated with the target data is data used together with the target data as a whole to generate check code. The check code may be stored in the same server as the target data or the data associated with the target data, or the check code may be independently stored in a server. When a timeout fault occurs during reading the target data by the processor core from the peer server or the processor core fails to read the target data due to an abnormal storage medium in this embodiment, the processor core may read the data associated with the target data and the check code from another server, and recover the to-be-read target data based on the data associated with the target data and the check code.

Method 3: Replica Read Processing

The replica read processing means that the target data is stored in a plurality of servers (for example, replica servers). When a timeout fault occurs during reading the target data by the processor core from the peer server or the processor core fails to read the target data due to an abnormal storage medium in this embodiment, the processor core may read the target data from another replica server storing the target data.

In the conventional technical solution, the processor core considers by default that the read access is successful, and does not check whether a returned result is invalid data. Compared with the conventional technical solution, in this embodiment, the processor core stores the response status identifier obtained from the notification message into the register, and adds the instruction to the internal memory of the server, so that the processor core executes the instruction to obtain the response status identifier carried in the notification message from the register. In this way, the processor core can determine the response status of the external controller to the data read packet based on the response status identifier before performing an operation on the returned data, and when the response status is an abnormal response, the processor core performs the fault tolerance processing for the abnormal response, thereby avoiding a restart of the data access system due to invalidity caused by performing an operation on the invalid data when the abnormal response is undetected.

The foregoing describes the fault tolerance processing method provided in the embodiments with reference to FIG. 1 and FIG. 2. The following describes a fault tolerance processing apparatus and server provided in the embodiments with reference to FIG. 3 and FIG. 4.

Figure 3:
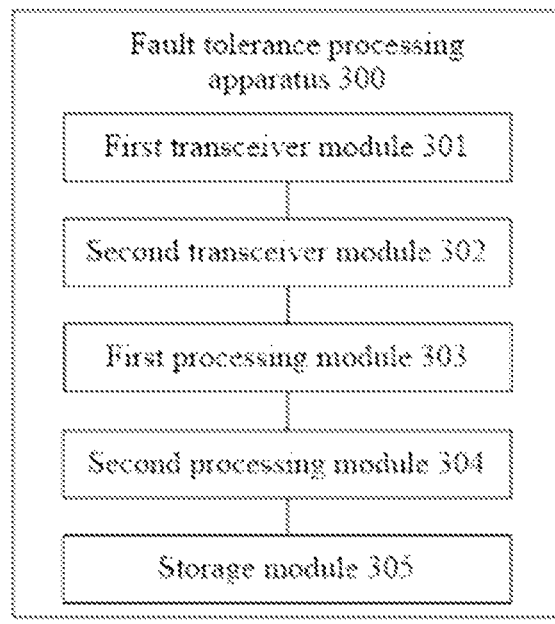
FIG. 3 is a schematic block diagram of a fault tolerance processing apparatus.

FIG. 3 is a schematic block diagram of a fault tolerance processing apparatus 300 according to an embodiment. The apparatus communicates with an external controller by using a memory-semantic network protocol, and the external controller is located outside the apparatus. The fault tolerance processing apparatus 300 includes a first transceiver module 301, a first processing module 303, a second transceiver module 302, a second processing module 304, and a storage module 305.

The first transceiver module 301 is configured to send a data read packet to the external controller. The data read packet is used to request the external controller to read data in an indicated storage location, and a packet format of the data read packet complies with a packet format specified in the memory-semantic network protocol.

The first transceiver module 301 is further configured to receive indication information sent by the external controller, where the indication information is used to indicate a response status of the external controller to the data read packet.

The first processing module 302 is configured to determine the response status of the external controller to the data read packet based on the indication information, and perform fault tolerance processing when the response status is an abnormal response.

Optionally, the first transceiver module 301 is further configured to perform format conversion on a packet received from the second transceiver module to generate the data read packet, and send the data read packet to the external controller.

Optionally, the first processing module 302 is further configured to determine a data read result of the external controller based on the indication information, and the data read result is used to indicate whether the external controller successfully reads the data. The internal controller generates a notification message based on the data read result. The notification message includes a response status identifier, and the response status identifier indicates that the external controller fails to read target data in storage space indicated by the data read packet.

Optionally, the first transceiver module 301 is further configured to send the notification message to the second transceiver module. The second transceiver module 303 is further configured to obtain the response status identifier from the notification message, and store the response status identifier into the storage module 305 of the apparatus. The apparatus further includes: the second processing module 304, further configured to obtain the response status identifier from the storage module 305, and determine the response status of the external controller to the data read packet based on the response status identifier.

Optionally, the response status identifier indicates that the external controller fails to read the target data in the storage space indicated by the data read packet, or the response status identifier indicates that the external controller successfully reads the target data in the storage space indicated by the data read packet.

Optionally, when the response status identifier indicates that the external controller fails to read the target data in the storage space indicated by the data read packet, the fault tolerance processing includes degraded read or replica read.

According to the fault tolerance processing apparatus provided in this embodiment, when read data access is performed, before the processor core performs an operation on invalid data returned by the external controller, a response status, to the data read packet, of a server that is requested to read data is determined, and fault tolerance processing is performed when the response status is the abnormal response, thereby avoiding a restart of a data access system due to invalidity caused by performing an operation on the invalid data when the abnormal response is not detected.

It should be understood that the fault tolerance processing apparatus in this embodiment may be implemented by using an application-specific integrated circuit (ASIC), or a programmable logic device (PLD). The PLD may be a complex programmable logic device (CPLD), an FPGA, a generic array logic (GAL), or any combination thereof. Alternatively, when the fault tolerance processing method shown in FIG. 2 may be implemented by using software, the apparatus 300 and modules of the apparatus 300 may also be software modules.

The fault tolerance processing apparatus 300 according to this embodiment may correspondingly perform the method 200 described in the embodiments. In addition, the foregoing and other operations and/or functions of the units in the apparatus 300 are used to respectively implement corresponding processes of the method 200 in FIG. 2. The first transceiver module 301 and the first processing module 302 are modules in the internal controller, and the second transceiver module 303 and the second processing module 304 are modules in the processor core. For brevity, details are not described herein again.

Figure 4:
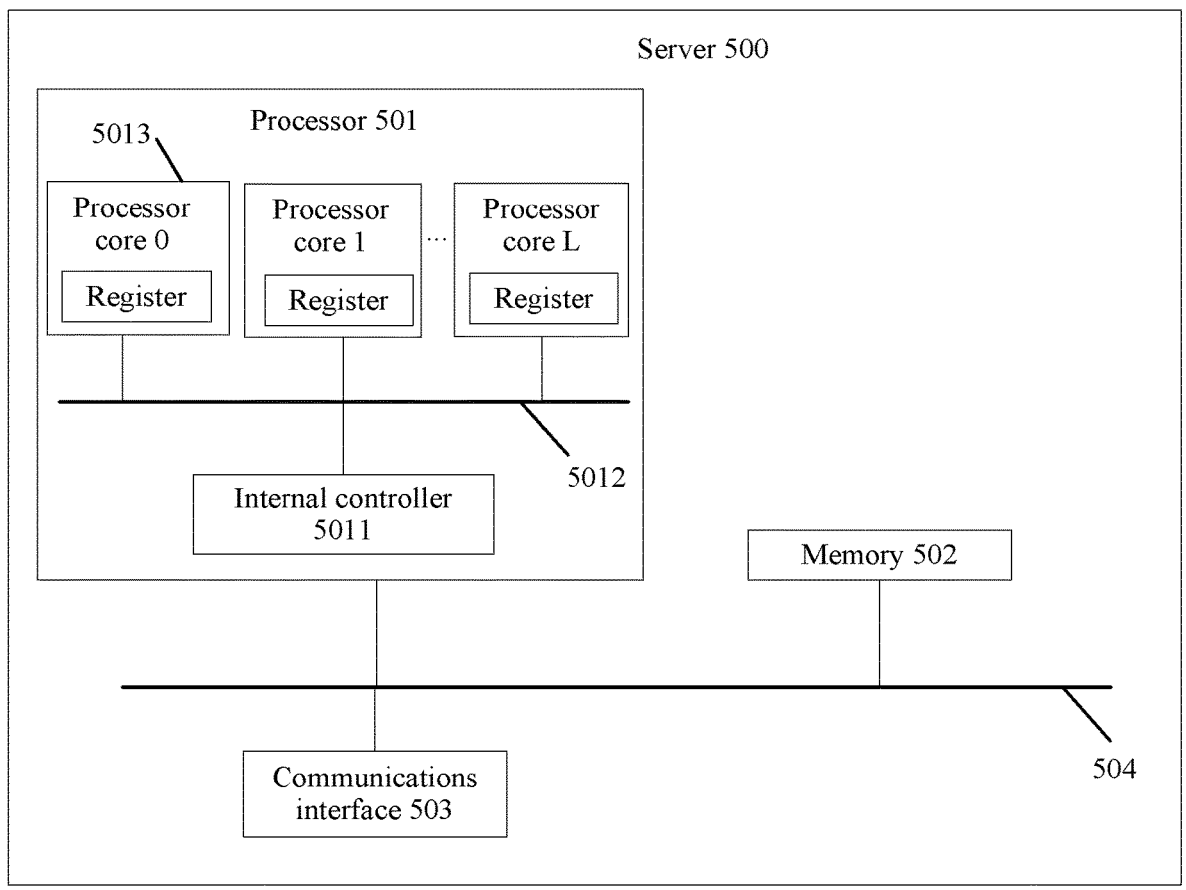
FIG. 4 is a schematic structural diagram of a server.

FIG. 4 is a schematic diagram of a server 500 according to an embodiment. As shown in FIG. 4, the server 500 includes a processor 501, a memory 502, a communications interface 503, and a bus 504. The processor 501, the memory 502, and the communications interface 503 perform communication by using the bus 504, or may implement communication by using other means such as wireless transmission.

The processor 501 includes a plurality of processor cores 5013 (for example, a processor core 0 to a processor core L, where L≥2) and an internal controller 5011. One or more registers (only one register is shown in FIG. 4) are deployed on each processor core 5013. The internal controller 5011 communicates with the plurality of processor cores by using an internal bus 5012.

The internal controller 5011 is configured to: send a data read packet to the external controller, where the data read packet is used to request the external controller to read data in an indicated storage location, and a packet format of the data read packet complies with a packet format specified in the memory-semantic network protocol; receive indication information sent by the external controller, where the indication information is used to indicate a response status of the external controller to the data read packet; and determine the response status of the external controller to the data read packet based on the indication information, and perform fault tolerance processing when the response status is an abnormal response.

Optionally, the internal controller 5011 is further configured to perform format conversion on a packet from the processor to generate the data read packet, and send the data read packet to the external controller.

Optionally, the internal controller 5011 is further configured to: determine a data read result of the external controller based on the indication information, where the data read result is used to indicate whether the external controller successfully reads the data; and generate a notification message based on the data read result, where the notification message includes a response status identifier, and the response status identifier indicates that the external controller fails to read target data in storage space indicated by the data read packet.

Optionally, the internal controller 5011 is further configured to send the notification message carrying the response status identifier to the processor 501.

The processor core 5013 in the processor 501 is configured to: obtain the response status identifier from the notification message; store the response status identifier into the register of the processor; obtain the response status identifier from the register; and determine the response status of the external controller to the data read packet based on the response status identifier.

Optionally, the fault tolerance processing includes degraded read or replica read.

According to the server provided in this embodiment, when the data read access is performed, before the processor core performs an operation on invalid data returned by the external controller, a response status, to the data read packet, of a server that is requested to read data is determined, and the fault tolerance processing is performed when the response status is the abnormal response, thereby avoiding a restart of a data access system due to invalidity caused by performing an operation on the invalid data when the abnormal response is not detected.

It should be understood that, the processor 501 in this embodiment may be a CPU, and the processor 501 may also be another general-purpose processor, an SoC, a digital signal processor (DSP), an ASIC, an FPGA or another programmable logic device, a discrete gate or a transistor logic device, a discrete hardware component, or the like. The general-purpose processor may be a microprocessor or any conventional processor or the like.

The memory 502 may include a read-only memory (ROM) and a random-access memory (RAM), and provide an instruction and data to the processor 501. The memory 502 may alternatively be a non-volatile RAM. For example, the memory 502 may further store information of a device type. The memory 502 may be a volatile memory or a nonvolatile memory, or may include a volatile memory and a nonvolatile memory. The nonvolatile memory may be a ROM, a programmable ROM (PROM), an erasable PROM (EPROM), an electrically EPROM (EEPROM), or a flash memory. The volatile memory may be a RAM, used as an external cache. For example, but not for limitative description, many forms of RAMS are available, for example, a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), and a direct Rambus RAM (DR RAM).

In addition to a data bus, the bus 504 may further include a power bus, a control bus, a status signal bus, and the like. However, for clear description, various types of buses in FIG. 4 are marked as the bus 504.

The internal bus 5012 may be any one of a QPI bus, an HT bus, and an HCCS bus.

It should be understood that the server 500 according to this embodiment may correspond to the server 400 in the embodiments, and may correspond to a corresponding execution body that performs the method 200 according to the embodiments. In addition, the foregoing and other operations and/or functions of the modules of the server 500 are used to respectively implement corresponding processes of the method 200 in FIG. 2. For brevity, details are not described herein again.

A person of ordinary skill in the art may be aware that, in combination with the embodiments described in this specification, units and algorithm steps of the examples may be implemented by electronic hardware or a combination of computer software and electronic hardware. Whether the functions are executed by hardware or software depends on particular applications and design constraints of the technical solutions. A person skilled in the art may use a different method to implement the described functions for each particular application, but it should not be considered that the implementation goes beyond the scope of the embodiments.

It may be clearly understood by a person skilled in the art that, for the purpose of convenient and brief description, for a specific working process of the foregoing system, apparatus, and unit, refer to a corresponding process in the foregoing method embodiments, and details are not described herein again.

In the several embodiments provided, it should be understood that the disclosed system, apparatus, and method may be implemented in another manner. For example, the described apparatus embodiment is merely an example. For example, the unit division is merely logical function division and may be another division in practical implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on practical requirements to achieve the objectives of the solutions of the embodiments.

In addition, functional units in the embodiments may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on a computer, the processes or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (DSL)) or wirelessly (for example, infrared, radio, or microwave). The computer-readable storage medium may be any usable medium accessible by a computer, or a data storage device, such as a server or a data center including one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive (SSD).

What is claimed is:

1. A method implemented by a server and comprising:
    sending, to an external controller and using a memory-semantic network protocol, a data read packet requesting the external controller to read data in an indicated storage location, wherein the data read packet comprises a packet format specified in the memory-semantic network protocol;
    receiving, from the external controller, indication information indicating a response status of the external controller to the data read packet; and
    performing fault tolerance processing when the response status is an abnormal response.

2. The method of claim 1, further comprising determining, before performing the fault tolerance processing, the response status based on the indication information.

3. The method of claim 2, further comprising:
    determining, by an internal controller of a processor of the server, a data read result of the external controller based on the indication information, wherein the data read result indicates whether the external controller successfully read the data; and
    generating, by the internal controller, a notification message based on the data read result, wherein the notification message comprises a response status identifier indicating that the external controller failed to read target data in a storage space indicated by the data read packet.

4. The method of claim 3, further comprising:
    sending, by the internal controller and to a processor core of the processor, the notification message;
    obtaining, by the processor core, the response status identifier from the notification message;
    storing, by the processor core, the response status identifier into a register of the processor core;
    obtaining, by the processor core, the response status identifier from the register; and
    determining, by the processor core, the response status based on the response status identifier.

5. The method of claim 1, further comprising:
    performing, by an internal controller of a processor of the server, format conversion on a packet to generate the data read packet; and
    further sending, by the internal controller and to the external controller, the data read packet.

6. The method of claim 1, wherein the fault tolerance processing comprises degraded reading or replica reading.

7. A fault tolerance processing server comprising:
    a processor comprising:
        a processor core, and
        an internal controller coupled to the processor core and configured to:
            send, to an external controller and using a memory-semantic network protocol, a data read packet requesting the external controller to read data in an indicated storage location, wherein the data read packet comprises a packet format specified in the memory-semantic network protocol;
            receive, from the external controller, indication information indicating a response status of the external controller to the data read packet; and
            perform fault tolerance processing when the response status is an abnormal response.

8. The fault tolerance processing server of claim 7, wherein the fault tolerance processing server is configured to determine, before performing the fault tolerance processing, the response status based on the indication information.

9. The fault tolerance processing server of claim 8, wherein the internal controller is further configured to:
    determine a data read result of the external controller based on the indication information, wherein the data read result indicates whether the external controller successfully read the data; and
    generate a notification message based on the data read result, wherein the notification message comprises a response status identifier indicating that the external controller failed to read target data in a storage space indicated by the data read packet.

10. The fault tolerance processing server of claim 9, wherein the internal controller is further configured to send the notification message to the processor core, and wherein the processor core is configured to:
  obtain the response status identifier from the notification message;
  store the response status identifier into a register of the processor core;
  obtain the response status identifier from the register; and
  determine the response status based on the response status identifier.

11. The fault tolerance processing server of claim 7, wherein the internal controller is further configured to:
  perform format conversion on a packet to generate the data read packet; and
  further send the data read packet to the external controller.

12. The fault tolerance processing server of claim 7, wherein the fault tolerance processing comprises degraded reading or replica reading.

13. A non-transitory computer-readable storage medium comprising instructions that, when executed by a processor, cause a server to:
  send, to an external controller and using a memory-semantic network protocol, a data read packet requesting the external controller to read data in an indicated storage location, wherein the data read packet comprises a packet format specified in the memory-semantic network protocol;
  receive, from the external controller, indication information indicating a response status of the external controller to the data read packet; and
  perform fault tolerance processing when the response status is an abnormal response.

14. The non-transitory computer-readable storage medium of claim 13, wherein the instructions further cause the server to determine, before performing the fault tolerance processing, the response status based on the indication information.

15. The non-transitory computer-readable storage medium of claim 14, wherein the instructions further cause the server to:
  determine a data read result of the external controller based on the indication information, wherein the data read result indicates whether the external controller successfully read the data; and
  generate a notification message based on the data read result, wherein the notification message comprises a response status identifier indicating that the external controller failed to read target data in a storage space indicated by the data read packet.

16. The non-transitory computer-readable storage medium of claim 15, wherein the instructions further cause the server to send the notification message to a processor core of the processor of the server.

17. The non-transitory computer-readable storage medium of claim 16, wherein the instructions further cause the server to:
  obtain the response status identifier from the notification message; and
  store the response status identifier into a register of the processor core.

18. The non-transitory computer-readable storage medium of claim 17, wherein the instructions further cause the server to:
  obtain the response status identifier from the register; and
  determine the response status based on the response status identifier.

19. The non-transitory computer-readable storage medium of claim 13, wherein the instructions further cause the server to:
  perform format conversion on a packet to generate the data read packet; and
  further send the data read packet to the external controller.

20. The non-transitory computer-readable storage medium of claim 13, wherein the fault tolerance processing comprises degraded reading or replica reading.

* * * * *

UNITED STATES PATENT AND TRADEMARK OFFICE
CERTIFICATE OF CORRECTION

Page 1 of 1

PATENT NO. : 11,231,983 B2
APPLICATION NO. : 17/121911
DATED : January 25, 2022
INVENTOR(S) : Zhou et al.

It is certified that error appears in the above-identified patent and that said Letters Patent is hereby corrected as shown below:

On the Title Page

Page 2, item (56) References Cited, Foreign Patent Documents: "CN 101692351 A 4/2014" should read "CN 101692351 A 4/2010"

Signed and Sealed this
First Day of March, 2022

Drew Hirshfeld
*Performing the Functions and Duties of the*
*Under Secretary of Commerce for Intellectual Property and*
*Director of the United States Patent and Trademark Office*